(12) United States Patent (10) Patent No.: US 9,141,587 B2
Aoki et al. (45) Date of Patent: Sep. 22, 2015

(54) PRINT CONTROL METHOD AND PRINT CONTROL APPARATUS FOR CONTROLLING PRINTING OF STRUCTURED DOCUMENT

(75) Inventors: Nobushige Aoki, Tokyo (JP); Asuka Kanno, Kakegawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 735 days.

(21) Appl. No.: 12/993,471

(22) PCT Filed: May 8, 2009

(86) PCT No.: PCT/JP2009/002014
§ 371 (c)(1),
(2), (4) Date: Nov. 18, 2010

(87) PCT Pub. No.: WO2009/141966
PCT Pub. Date: Nov. 26, 2009

(65) Prior Publication Data
US 2011/0096361 A1 Apr. 28, 2011

(30) Foreign Application Priority Data
May 19, 2008 (JP) .................. 2008-130763

(51) Int. Cl.
G06K 15/00 (2006.01)
G06F 17/21 (2006.01)
G06F 17/22 (2006.01)
G06F 3/12 (2006.01)

(52) U.S. Cl.
CPC .......... G06F 17/212 (2013.01); G06F 17/2247 (2013.01); G06F 3/1297 (2013.01)

(58) Field of Classification Search
CPC . G06F 17/211; G06F 17/212; G06F 17/2247; G06F 17/2229; G06F 17/3089; G06F 17/30899; G06F 3/1204; G06F 3/1205; G06F 3/1246; G06F 3/1284; G06F 3/1285; G06F 3/1287
USPC ........................................... 358/1.18
See application file for complete search history.

(56) References Cited

U.S. PATENT DOCUMENTS

| 7,249,319 | B1 | 7/2007 | Payne | |
|---|---|---|---|---|
| 2003/0011802 | A1 * | 1/2003 | Nakagiri et al. | 358/1.13 |
| 2006/0232836 | A1 * | 10/2006 | Yamada et al. | 358/527 |
| 2007/0050703 | A1 * | 3/2007 | Lebel | 715/513 |
| 2009/0021790 | A1 * | 1/2009 | Krovitz et al. | 358/1.18 |

FOREIGN PATENT DOCUMENTS

| AU | 2004201773 A1 * | 6/2004 |
|---|---|---|
| JP | 2002063013 A | 2/2002 |
| WO | 94/14122 A1 | 6/1994 |
| WO | 01/88715 A1 | 11/2001 |
| WO | 2006/015362 A2 | 2/2006 |

* cited by examiner

*Primary Examiner* — Fred Guillermety
(74) *Attorney, Agent, or Firm* — Canon USA Inc. IP Division

(57) ABSTRACT

A print control method causes a printing apparatus to print an image on the basis of a structured document containing a plurality of hierarchical elements. In the print control method, a print preview image and a tree view showing a hierarchy of the elements contained in the structured document are displayed. In the tree view, the elements are displayed in a selectable manner When an instruction to specify an element is input, an updated print preview image including the specified element is displayed. Thus, the user can easily remove unnecessary part of a Web page on a print preview screen and print the resulting Web page.

29 Claims, 15 Drawing Sheets

```
<!DOCTYPE html PUBLIC "-//XXX//DTD XHTML 1.0 Transitional//EN" "http://www.xxx.xxxx/TR/xhtml1/DTD/xhtml1-transitional.dtd">
<html xmlns="http://www.xxx.xxx/xxx/xhtml" xml:lang="ja" lang="ja">
<head>
<meta http-equiv="Content-Type" content="text/html; charset=UTF-8"/>
<link rel="stylesheet" type="text/css" href="top_j.css"/>
<title>Sample Page</title>
</head>
<body>
<div id="head">
<p>2008/01/01</p>
</div>
<div id="container">
<div id="menu">
<ul>
<li><a href="top_01.html">Product Information</a></li>
<li><a href="top_02.html">Solution</a></li>
<li><a href="top_03.html">Support</a></li>
<li><a href="top_04.html">Download</a></li>
<li><a href="top_05.html">Event</a></li>
</ul>
</div>
<div id="category">
<ul>
<li><a href="/product/camera/index.html"><img src="images/button_camera.gif" alt="Camera" border="0" /></a></li>
<li><a href="/product/printer/index.html"><img src="images/button_printer.gif" alt="Printer" border="0" /></a></li>
<li><a href="/product/scanner/index.html"><img src="images/button_scanner.gif" alt="Scanner" border="0" /></a></li>
<li><a href="/product/copy/index.html"><img src="images/button_copy.gif" alt="Copy" border="0" /></a></li>
<li><img src="/product/other/index.html"><img src="images/button_other.gif" alt="Other" border="0" /></li>
</ul>
</div>
</div>
・・・(snip)・・・
</body>
</html>
```

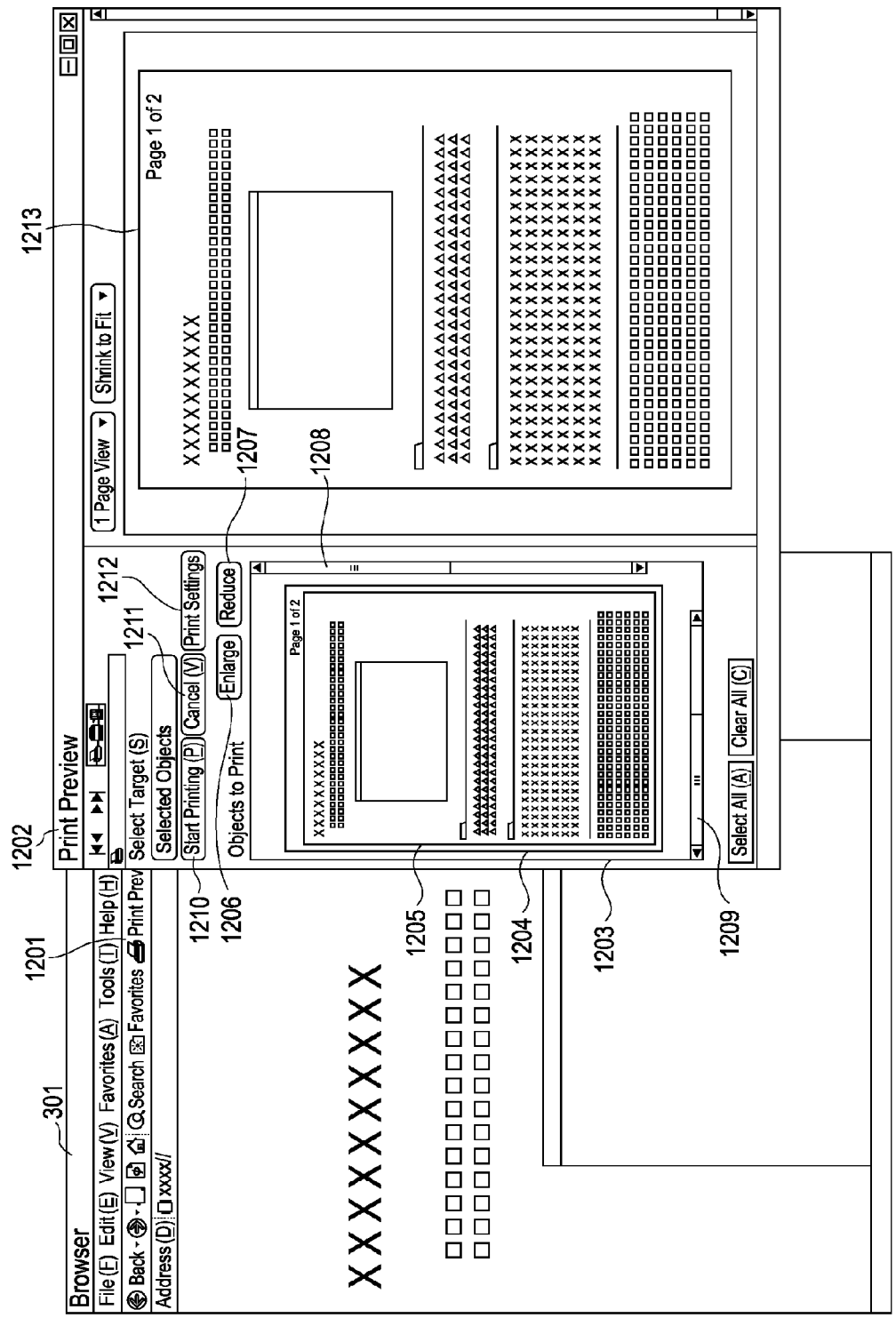

PRINT CONTROL METHOD AND PRINT CONTROL APPARATUS FOR CONTROLLING PRINTING OF STRUCTURED DOCUMENT

CROSS REFERENCE TO RELATED APPLICATIONS

This application is a National Stage filing of PCT Application No. PCT/JP2009/002014 filed on May 8, 2009, which claims priority from Japan Patent Application No. 2008-130763 filed on May 19, 2008, the disclosures of each of which are hereby incorporated by reference herein in their entirety.

TECHNICAL FIELD

The present invention relates to print control methods for controlling printing of a structured document. In particular, the present invention relates to a print control method and a print control apparatus for selecting one or more elements contained in a structured document and causing a printing apparatus to print the selected one or more elements.

BACKGROUND ART

In recent years, it has been possible to obtain various kinds of information by accessing Web pages on the Internet. These Web pages are structured documents written in a structured language, such as hyper text markup language (HTML) or extensible hyper text markup language (XHTML). The Web pages can be displayed on a display in a viewable manner by software called browser supporting such a structured document. Typically, a Web page to be printed is displayed on a display by a browser, and the displayed page is printed. Japanese Patent No. 3588337 describes a method in which, within a Web page displayed by a browser, an area selected by the user with a pointing device (e.g., mouse) is printed.

However, in the known method described above, no consideration is given to cases where a plurality of parts the user wants to print are scattered within the Web page. Therefore, to print the Web page except a plurality of unnecessary parts scattered therewithin, the user has to edit the Web page and thus has to perform complicated operations.

In view of the problem described above, the present invention provides a print control method which allows the user to easily remove unnecessary parts scattered within a Web page and print the resulting Web page.

Patent Citation 1: Japanese Patent No. 3588337

DISCLOSURE OF INVENTION

The present invention provides a print control method in which, to print a Web page, parts of the Web page can be easily removed and the resulting Web page can be printed.

Specifically, the present invention provides a print control method for causing a printing apparatus to print an image on the basis of a structured document containing a plurality of elements. The print control method includes causing a display device to display a first image including elements contained in a structured document in such a manner that elements included in the first image and being selectable as a print target are displayed separately from each other; determining, when an instruction to select one or more elements in the first image is input, the one or more elements selected in accordance with the instruction as elements to be printed; and causing the printing apparatus to print an image where the selected elements in the displayed first image are arranged and the one or more not selected elements are omitted.

BRIEF DESCRIPTION OF THE DRAWINGS

FIG. 8 illustrates an example of a structured document.

FIG. 12A illustrates an example of a print preview screen including a layout view.

DESCRIPTION OF EMBODIMENTS

Hereinafter, exemplary embodiments of the present invention will be described in detail with reference to the attached drawings. The following exemplary embodiments are not intended to limit the scope of the present invention. At the same time, not all combinations of features explained in the exemplary embodiments are essential to solving means of the present invention.

Figure 1:
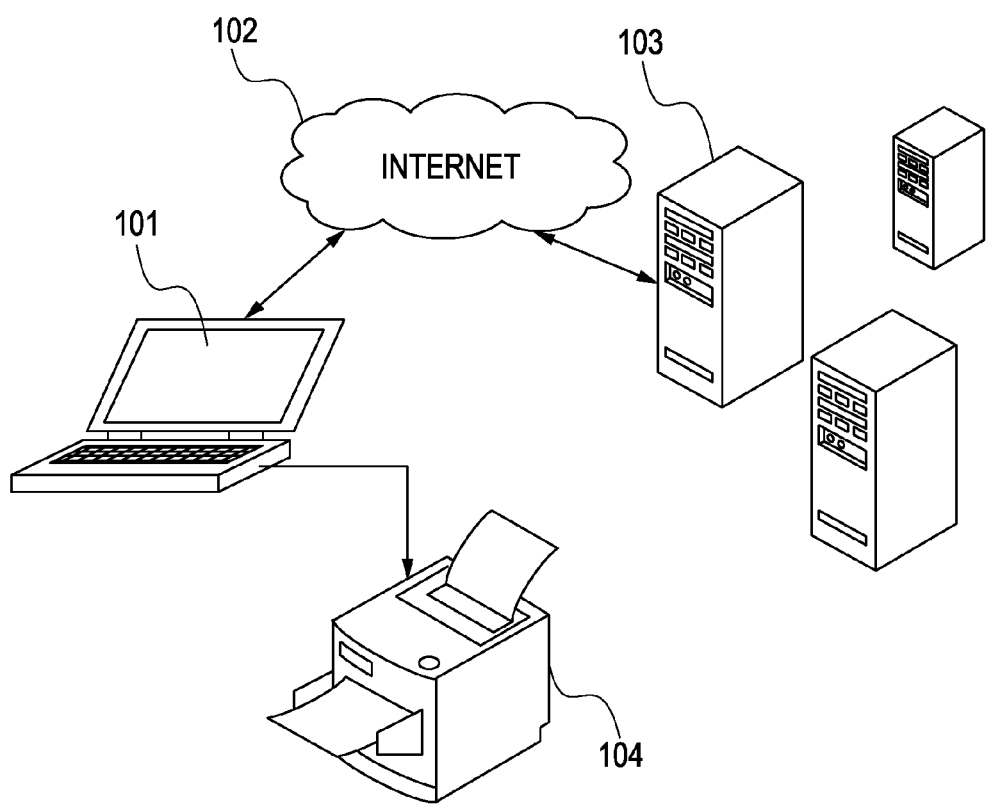
FIG. 1 illustrates a configuration of a network system according to an exemplary embodiment of the present invention.

FIG. 1 illustrates a configuration of a network system according to an exemplary embodiment of the present invention. Referring to FIG. 1, a personal computer (PC) 101 is connected to the Internet 102, through which Web pages are downloaded from a plurality of WWW servers 103 to the PC 101 and displayed. A Web page is a structured document written in HTML or XHTML. The PC 101 is locally connected to a printer 104 via a universal serial bus (USB) or the like. Web pages downloaded from the WWW servers 103 can be printed by the printer 104.

Figure 2:
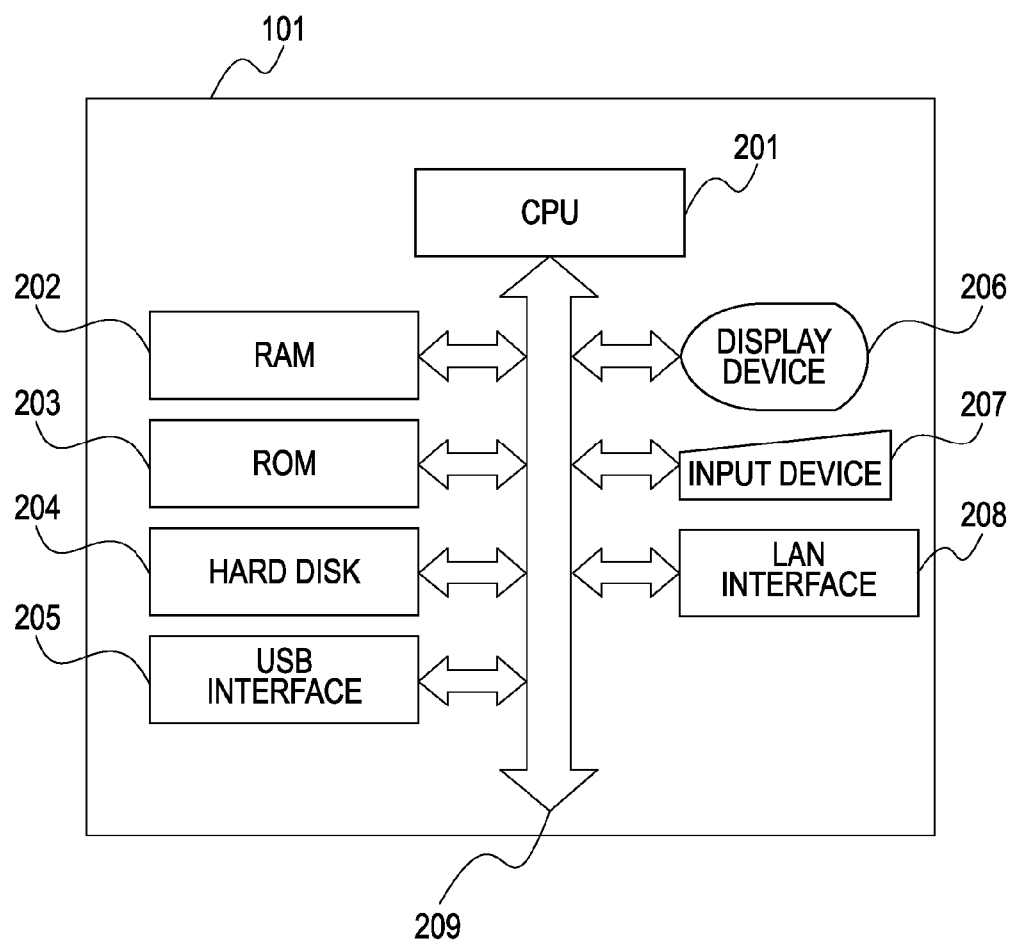
FIG. 2 illustrates a configuration of a personal computer (PC) illustrated in FIG. 1.

FIG. 2 illustrates a configuration the PC 101. In accordance with programs stored in a random-access memory (RAM) 202, a read-only memory (ROM) 203, or a hard disk 204, a central processing unit (CPU) 201 calculates, determines, and controls data and commands The RAM 202 is a temporary storage area used by the CPU 201 to perform various kinds of processing. The hard disk 204 stores an operating system (OS), a browser, and other application software programs.

A USB interface 205 is an interface to which a USB cable is connected. Data communication with the printer 104 is made via the USB cable. Alternatively, data communication with the printer 104 may be made via a small computer system interface (SCSI) or wirelessly.

A display device 206 includes a cathode-ray tube (CRT) or a liquid crystal display, and a graphics controller. The display device 206 displays Web pages downloaded from servers, a print preview image, a graphical user interface (GUI), etc.

An input device 207 is operated by the user to give various instructions to the PC 101. Examples of the input device 207 include a mouse and a keyboard. The PC 101 inputs various instructions from the user and performs various control operations in accordance with the instructions.

A local area network (LAN) interface 208 is an interface to which a LAN cable is connected. Data communication with the external WWW servers 103 is made via a router (not shown) and the Internet 102. Alternatively, this data communication may be made wirelessly, for example, via an interface supporting wireless communication.

A system bus 209 transmits and receives data to and from the CPU 201, the RAM 202, the ROM 203, and the hard disk 204.

The PC 101 illustrated in FIG. 2 is a so-call notebook PC, which combines the display device 206 and the input device 207 with a controller including the CPU 201 and the RAM 202. However, the present invention is not limited to this. The present invention may be applied to a so-called desktop PC, which includes a controller and is externally provided with a display device and an input device.

Figure 3:
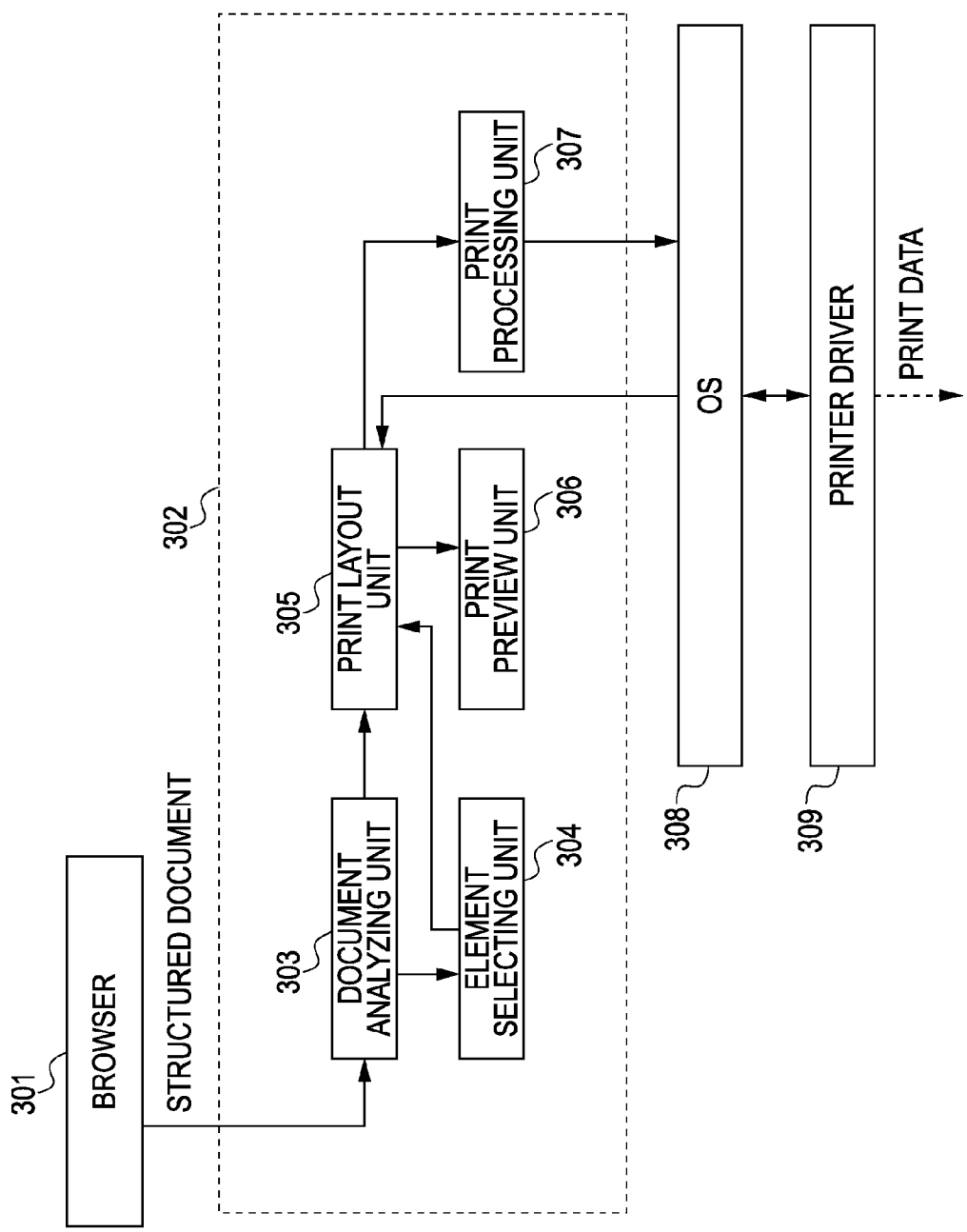
FIG. 3 illustrates a software configuration of the PC of FIG. 1.

FIG. 3 illustrates a software configuration of the PC 101 according to the present exemplary embodiment. With reference to FIG. 3, programs running on the PC 101 and their data processing configuration will be described.

The programs illustrated in FIG. 3 are stored in the ROM 203 and the hard disk 204 illustrated in FIG. 2. The CPU 201 executes the programs using the RAM 202 as a temporary storage area.

A browser 301 is an application for displaying Web pages. The browser 301 downloads Web pages from the WWW servers 103 to the hard disk 204 and displays them on the display device 206. Web pages are structured documents written in HTML or XHTML. The Web pages are composed of text and images called elements, which are written using tags. Additionally, there is a separate file called cascading style sheet (hereinafter abbreviated as CSS) which defines display styles of the elements and is specified within a structured document.

FIG. 8 illustrates an example of a structured document. A structured document 801 illustrated in FIG. 8 is written in XHTML. While not shown, a CSS is provided as a separate file indicating the arrangement of elements, and is specified in the structured document 801.

A structured document has a hierarchical structure. Elements constituting the hierarchical structure have hierarchical relationships with one another.

By analyzing structured document files, the browser 301 can display Web pages on the display device 206.

Referring back to FIG. 3, a print module 302 is a module for printing structured documents. The print module 302 is plug-in software called by the browser 301. When the user instructs the browser 301 to print a structured document or display a print preview of the structured document, the print module 302 is executed and reads out the structured document through the browser 301. This structured document is first analyzed by a document analyzing unit 303 of the print module 302.

The document analyzing unit 303 analyzes elements of a Web page, the elements being within the structured document, and creates hierarchically structured data called document object model (DOM) tree in the RAM 202.

From the elements of the DOM tree, the document analyzing unit 303 removes those not reflected in printing, and creates a print-target-element tree in the RAM 202. Examples of the elements not reflected in printing include an element representing a Web page title.

The DOM tree and the print-target-element tree will be described in detail later on.

An element selecting unit 304 reads, from the RAM 202, the print-target-element tree created by the document analyzing unit 303. Then, the element selecting unit 304 performs display control such that the display device 206 displays an element tree view as a GUI. The user uses a mouse, a keyboard, or the like to give an instruction to select each item of the element tree view. Thus, an element to be printed is specified.

A print layout unit 305 determines a print layout of elements selected by the user and included in the print-target-element tree. The print layout is determined in accordance with attributes of the elements analyzed by the document analyzing unit 303, arrangement information defined in the CSS file, and print settings. The print settings include information, such as paper size, resolution, and printable area, and are obtained from a printer driver 309 through an OS 308. The arrangement information indicating the determined layout may be stored in the RAM 202.

In accordance with the layout determined by the print layout unit 305, a print preview unit 306 generates a print preview image in which the elements of the print-target-element tree are arranged, and performs display control to display the print preview image on the display device 206.

When an instruction to start printing is input from the user, a print processing unit 307 executes drawing processing for the printer driver 309 through the OS 308 in accordance with the element arrangement information indicating the layout determined by the print layout unit 305.

For the print module 302, the OS 308 provides an application programming interface (API) for transmitting and receiving print setting data to and from the printer driver 309, and also provides an API for performing drawing processing. Although not described in detail here, the OS 308 includes various control software programs, such as a spooler system that manages print jobs and a port monitor that outputs a printer command to a port.

The printer driver 309 generates print data in accordance with the drawing processing executed by the print processing unit 307, converts the print data into a printer command, and transmits the printer command through the OS 308 to the printer 104.

When the print control described above is performed, the printer 104 receives the print command and performs a print operation. Thus, an image containing elements arranged in the layout indicated by the above-described arrangement information is recorded on a sheet.

Figure 9:
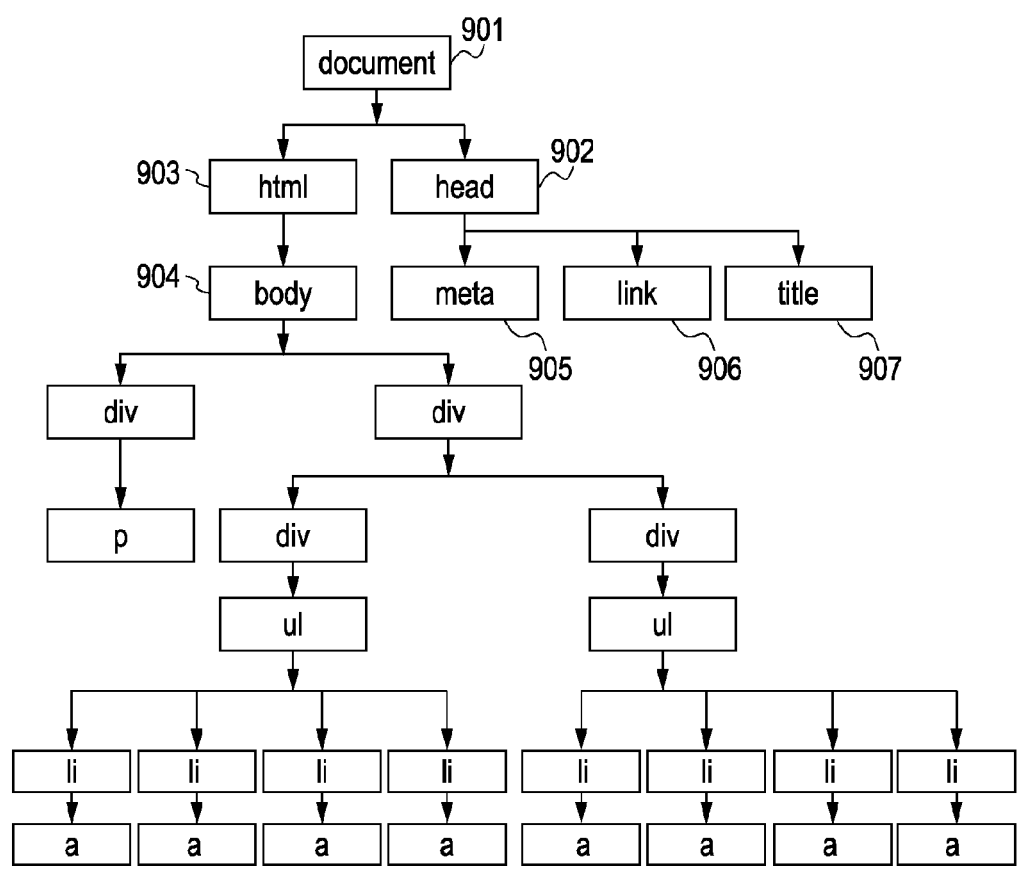
FIG. 9 illustrates an example of a document object model (DOM) tree.

FIG. 9 illustrates an example of a DOM tree. A DOM tree represents a hierarchical data structure of a structured document. FIG. 9 illustrates a DOM tree obtained when the document analyzing unit 303 analyzes the structured document 801. This DOM tree is stored in the RAM 202.

The DOM tree of FIG. 9 has, as a root node, a <document> node 901 representing the entire document. The <document> node 901 has a <head> node 902 and an <HTML> node 903 as child nodes. The <HTML> node 903 has a <body> node 904 as a child node.

Each element node holds data, such as a pointer to a parent element node, a pointer to a brother element node, a pointer to a child element node list, attribute information, and text information.

A display state and arrangement information of each element are defined in the CSS file, and are stored in the RAM 202 as information about each element node of the DOM tree. Examples of the information about each element node include font type, font size, font color, and display position of the element.

Figure 10:
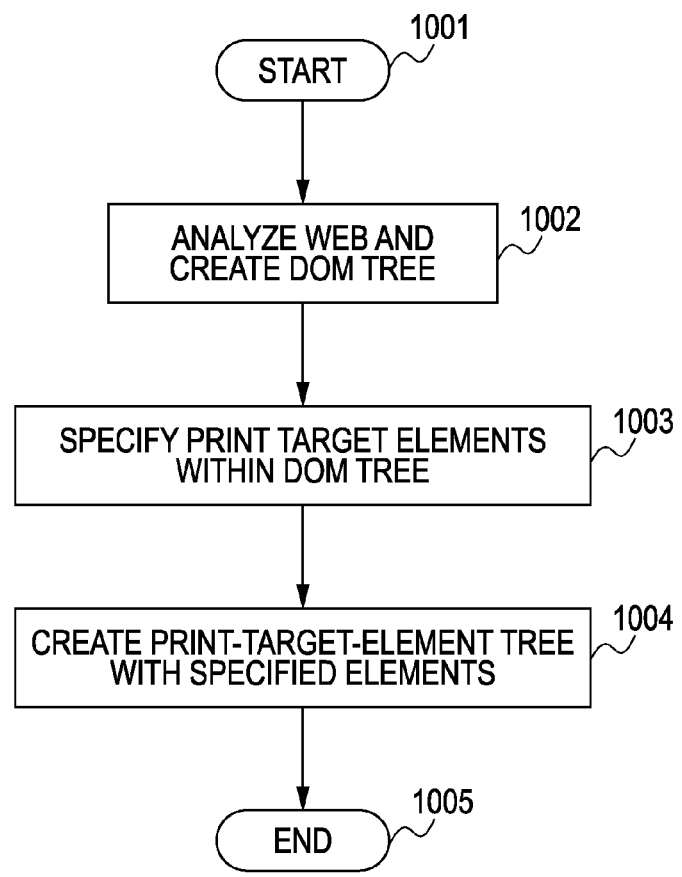
FIG. 10 is a flowchart of a processing procedure for analyzing a structured document and creating a print-target-element tree.

FIG. 10 is a flowchart of a processing procedure in which the document analyzing unit 303 analyzes a structured document and creates a print-target-element tree.

When a Print Preview button 401 of the browser 301 is pressed, the print module 302 for printing a structured document is activated, and processing of the document analyzing unit 303 starts (step S1001). The document analyzing unit 303 reads a specified Web page and a CSS file through the browser 301, analyzes the Web page, creates a DOM tree such as that illustrated in FIG. 9, and stores the DOM tree in the RAM 202 (step S1002).

From element nodes within the DOM tree, the document analyzing unit 303 removes those not reflected in printing, and specifies print target elements (step S1003). Specifically, in FIG. 9, the <head> node 902, a <meta> node 905, a <link> node 906, and a <title> node 907 are removed from the DOM tree, as they are elements not reflected in printing.

Then last, the document analyzing unit 303 creates a print-target-element tree with the element nodes specified in step S1003, and stores the print-target-element tree in the RAM 202 (step S1004). The processing thus ends (step S1005).

In accordance with the processing procedure described above, the document analyzing unit 303 creates a print-target-element tree.

Figure 4:
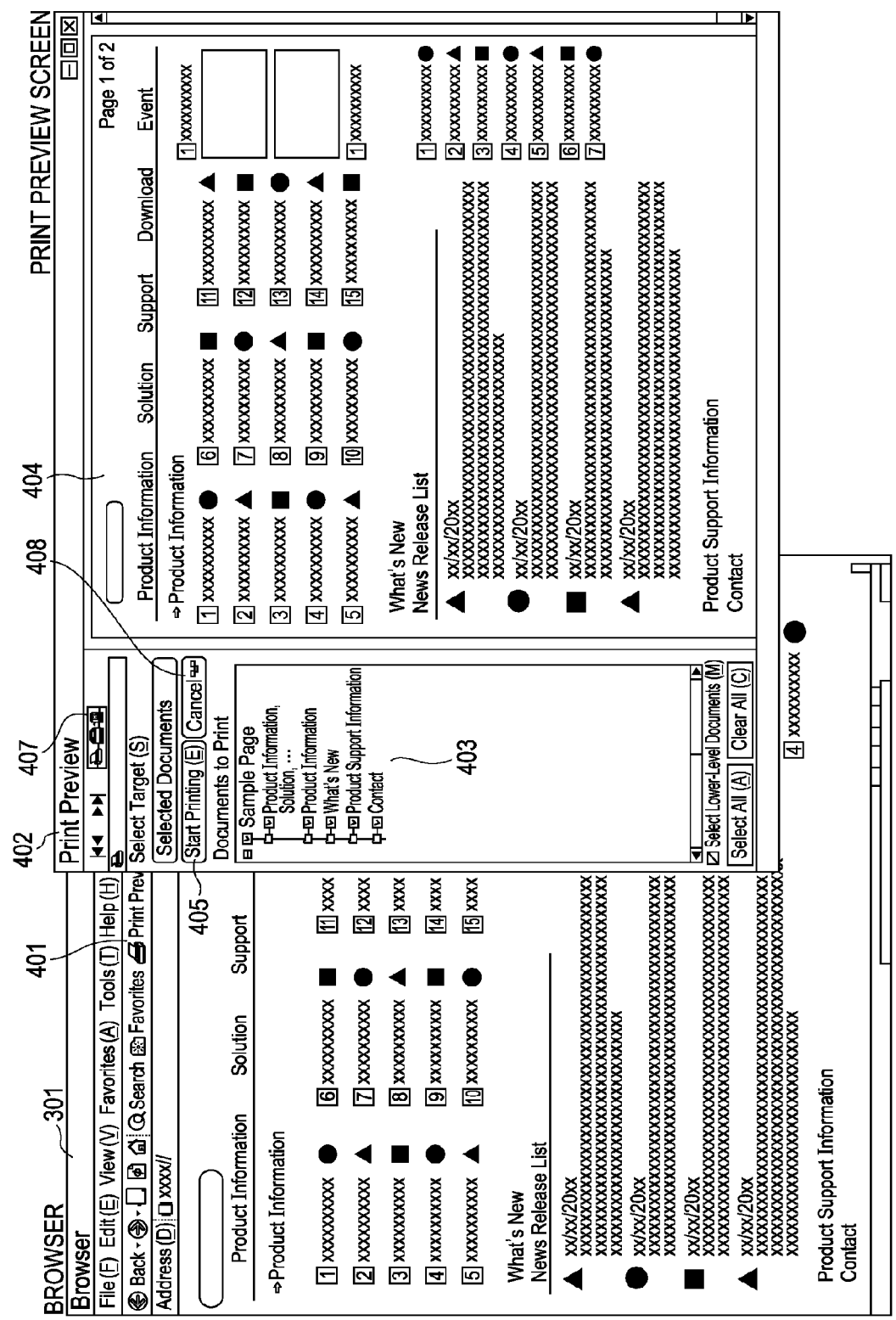
FIG. 4 illustrates an example of a print preview screen including an element tree view.

FIG. 4 illustrates an example of a print preview screen including an element tree view.

As illustrated, the browser 301 first displays a Web page on the screen. When the Print Preview button 401 arranged within the displayed screen is clicked, the browser 301 calls the print module 302 using a structured document file corresponding to the displayed Web page as a parameter. The print module 302 analyzes the structured document file corresponding to the displayed Web page and displays a print preview screen 402.

An element tree view 403 of FIG. 4 is a representation of a print-target-element tree displayed by the element selecting unit 304. The element tree view 403 is composed of user-selectable items. The items of the element tree view 403 correspond to respective elements of a structured document. A character string contained in each element of the structured document is displayed as an item. Therefore, by comparing character strings displayed as items with character strings contained in the elements of the structured document, the user can recognize which item corresponds to which element in a print preview image. If an element contains no character string, a character string contained in its child element may be displayed as an item.

Each item in the element tree view 403 has a corresponding check box. On the basis of whether the check box is checked, the element selecting unit 304 of FIG. 3 determines whether the corresponding element is selected by the user. Therefore, when the user changes the checked state, the print-target-element tree is updated, so that a new print-target-element tree is created with elements corresponding to checked items.

By checking a check box with the mouse or keyboard, the user can select an element corresponding to the check box as a print target. Conversely, by deselecting a check box, the user can remove an element corresponding to the check box from a list of print targets. In particular, by changing the checked state of a higher-level element in the print-target-element tree, determinations for a plurality of elements, including lower-level elements, can be made as to whether they are print targets.

A print preview image generated by the print preview unit 306 of FIG. 3 is displayed in a print preview display section 404. Since the print preview image is generated on the basis of the print-target-element tree, only elements selected in the element tree view 403 by the user are arranged in the print preview image. Therefore, by checking check boxes in the element tree view 403, the user can not only select elements to be printed, but can also view a print preview of the selected elements.

On the print preview screen 402, a Start Printing button 405 is used to give an instruction to start printing. Clicking the Start Printing button 405 causes the printer 104 to print an image displayed in the print preview display section 404 on a recording medium, such as a sheet.

A Cancel button 406 is used to give an instruction to stop printing. A print settings menu 407 is a drop-down menu for making various print settings. The user uses the print settings menu 407 to specify paper size, print quality, margin, etc.

Figure 5:
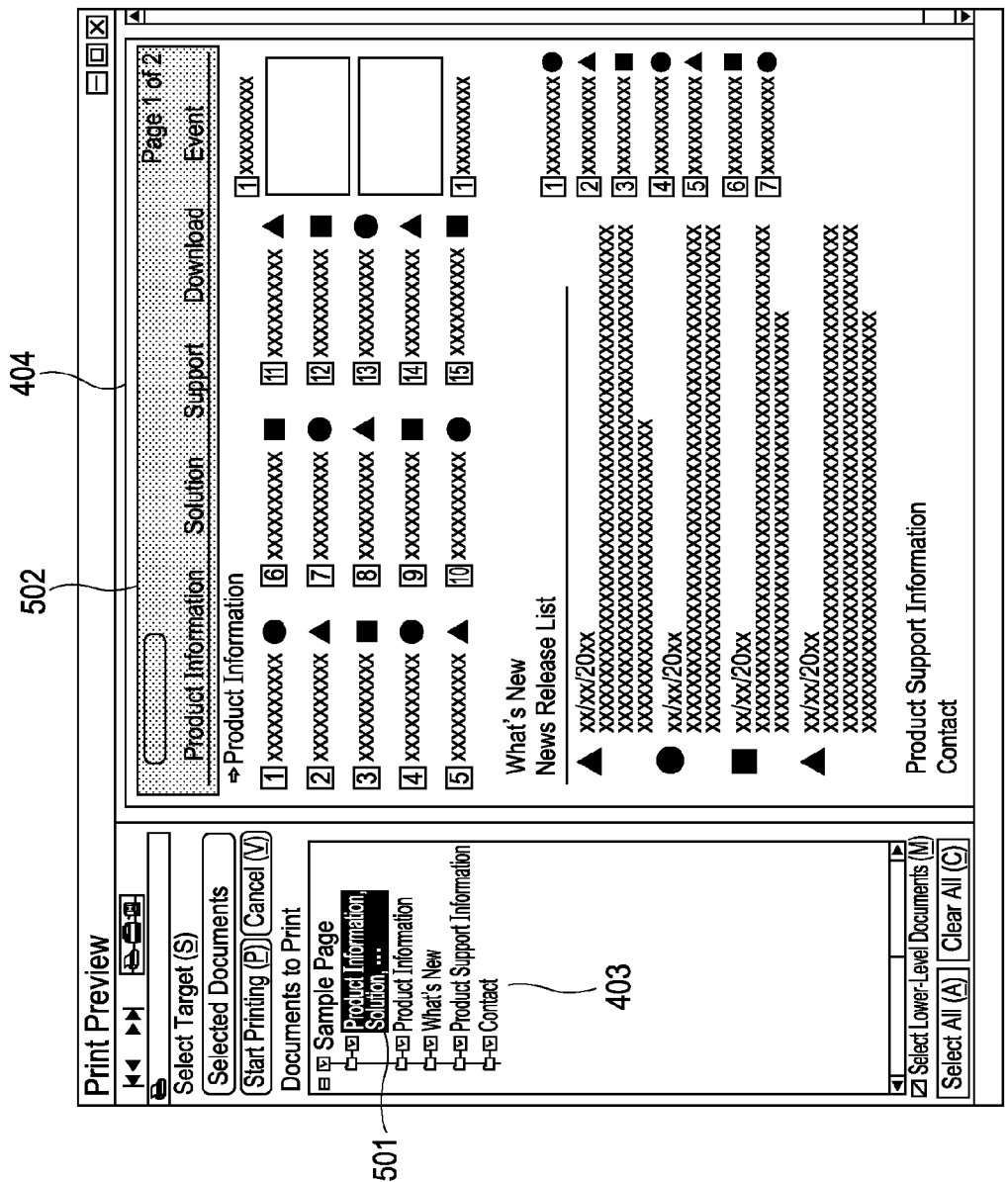
FIG. 5 illustrates a print preview screen displayed when a Print Preview button of FIG. 4 is clicked.
Figure 6:
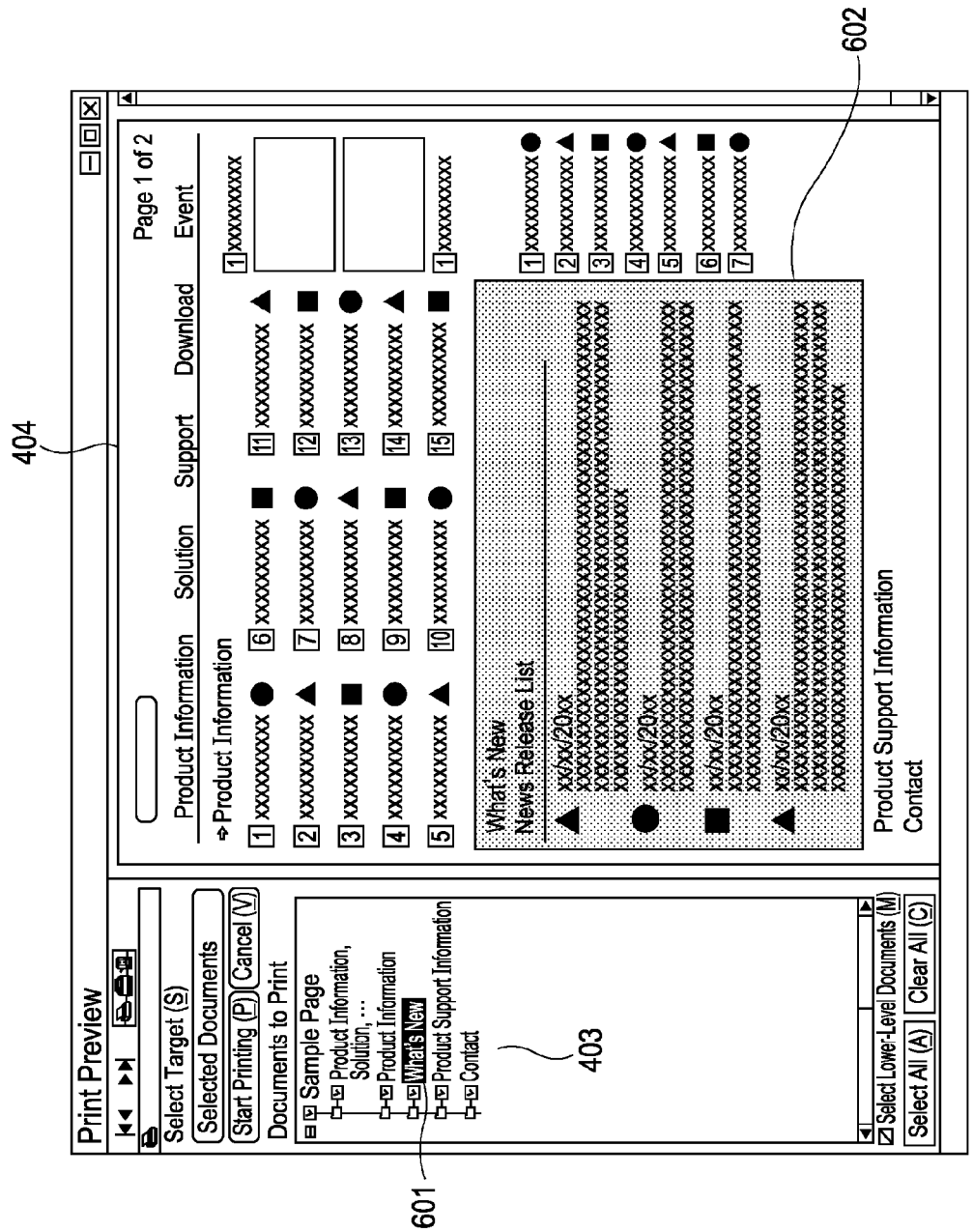
FIG. 6 illustrates a print preview screen where a rectangular area constituting part of a print preview image is selected.
Figure 7:
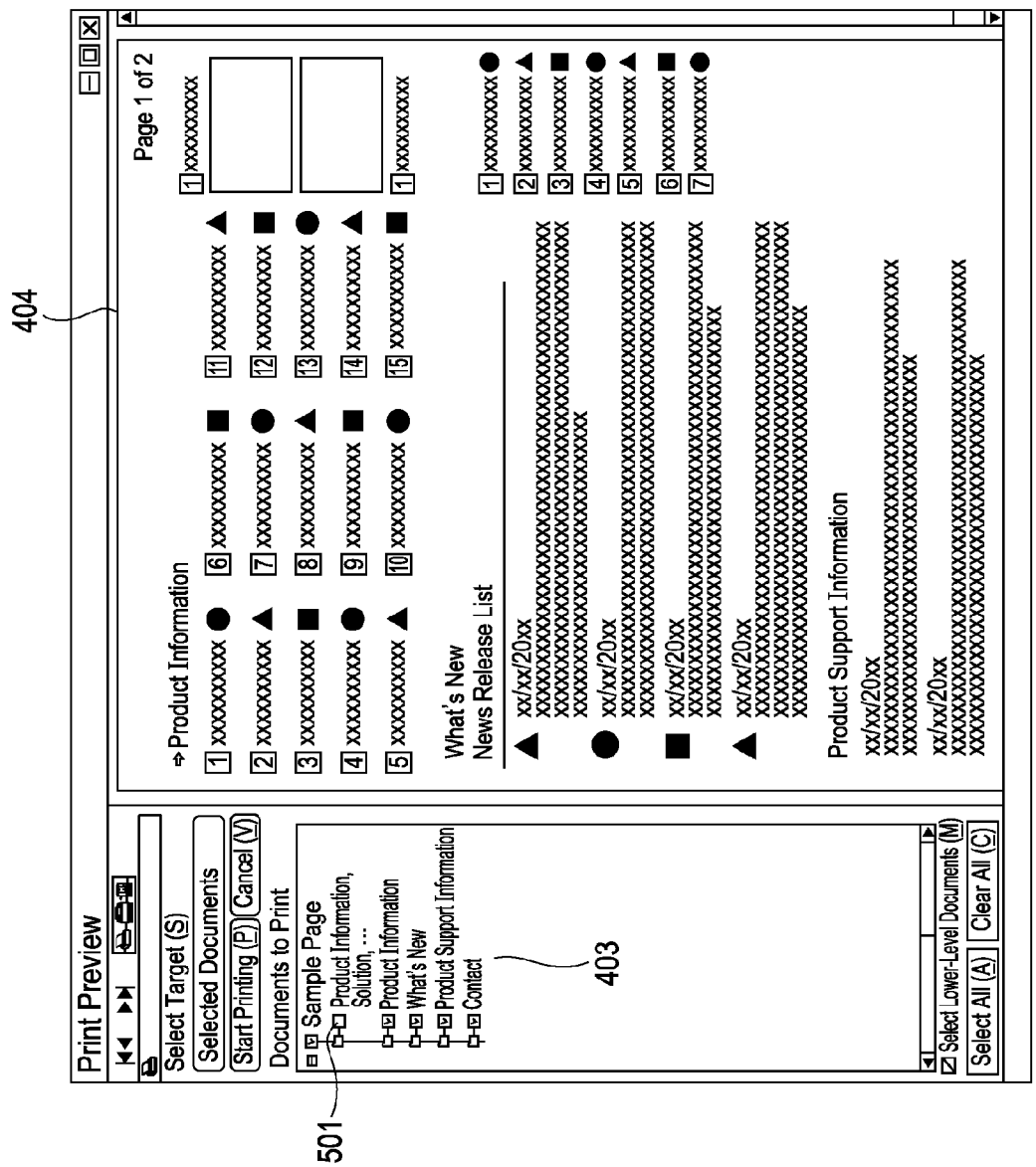
FIG. 7 illustrates a print preview screen where part of elements within a print preview image is deselected.

FIG. 5, FIG. 6, and FIG. 7 each illustrate a GUI screen to explain operations performed on the print preview screen 402 for element selection.

FIG. 5 illustrates a print preview screen displayed when the Print Preview button 401 is clicked. As illustrated, check boxes for all items in the element tree view 403 are selected. Displaying this print preview screen may be referred to as "first display control", and a print preview image displayed may be referred to as "first image".

A cursor appears on the print preview screen. When the user operates the mouse, the cursor moves on the screen accordingly. In FIG. 5, the cursor is placed on an item 501, which is focused and highlighted. A rectangular area 502 within the print preview display section 404 is an element corresponding to the item 501. When the item 501 is focused, the display color of the rectangular area 502 is changed. As illustrated, the rectangular area 502 is displayed translucently in a color different from that of the other area. This allows the user to easily recognize which part of the print preview image corresponds to the element corresponding to the item 501. Alternatively, the change in display color of the rectangular area 502 may take place when the user clicks the item 501 on which the cursor is placed.

When the Print Preview button 401 is pressed, only items corresponding to higher-level elements in the print-target-element tree may be displayed in the element tree view 403. In this case, when the user gives an instruction to display lower-level elements, the displayed items in the element tree view 403 may be expanded to display items corresponding to the lower-level elements.

FIG. 6 illustrates a print preview screen where a rectangular area constituting part of a print preview image is selected.

When the cursor appears in the print preview display section 404 and the user performs a mouse drag operation, a position at which the drag operation has been performed is detected. Then, a rectangular area 602 at the detected position is displayed translucently in a color different from that of the other area.

On the basis of the detected position and information indicating the layout of the print preview image, such as arrangement information stored in the CSS and the RAM 202, it is possible to determine which item in the element tree view 403 corresponds to an element selected by the user. In FIG. 6, an item 601 corresponding to the rectangular area 602 is highlighted. This allows the user to easily recognize which item in the element tree view 403 corresponds to an area of the print preview image, and thus facilitates selection of an item.

FIG. 7 illustrates a print preview screen where part of elements within a print preview image is deselected. In FIG. 7, the check box corresponding to the item 501 displayed in the element tree view 403 is deselected. When the item 501 is thus deselected, the rectangular area 502 displayed on the print preview screen illustrated in FIG. 5 is not displayed, and other elements are slid upward and rearranged. Displaying the screen of FIG. 7 may be referred to as "second display control", and the print preview image displayed in FIG. 7 may be referred to as "second image".

Thus, when selection of elements to be printed is changed, the element selecting unit 304 of FIG. 3 updates the print-target-element tree, and the print layout unit 305 changes the layout of the print preview image.

Arrangement information indicating the updated layout may be stored in the RAM 202 by the print layout unit 305. In this case, each time the layout of the print preview image is updated, arrangement information indicating the layout is updated.

As described above, in the present exemplary embodiment, elements of a structured document are displayed as an element tree view, so that the user can select elements to be printed. Therefore, the user can easily select and print necessary part of the Web page.

In the present exemplary embodiment described above, each check box in the element tree view allows selection of an area to be printed. Alternatively, an area selected by a drag operation on the print preview image by the user may be removed from the print preview image. This is advantageous in that the step of deselecting a check box can be skipped.

In the present exemplary embodiment described above, character strings contained in respective elements are displayed as items in the element tree view 403. Alternatively, reduced-size images corresponding to respective elements may be used to create an element tree view.

Although processing is performed on the PC 101 in the present exemplary embodiment described above, the present invention is not limited to this. That is, processing according to an exemplary embodiment of the present invention may be performed on a printer, so that a print preview may be displayed on a display screen of the printer.

Figure 11:
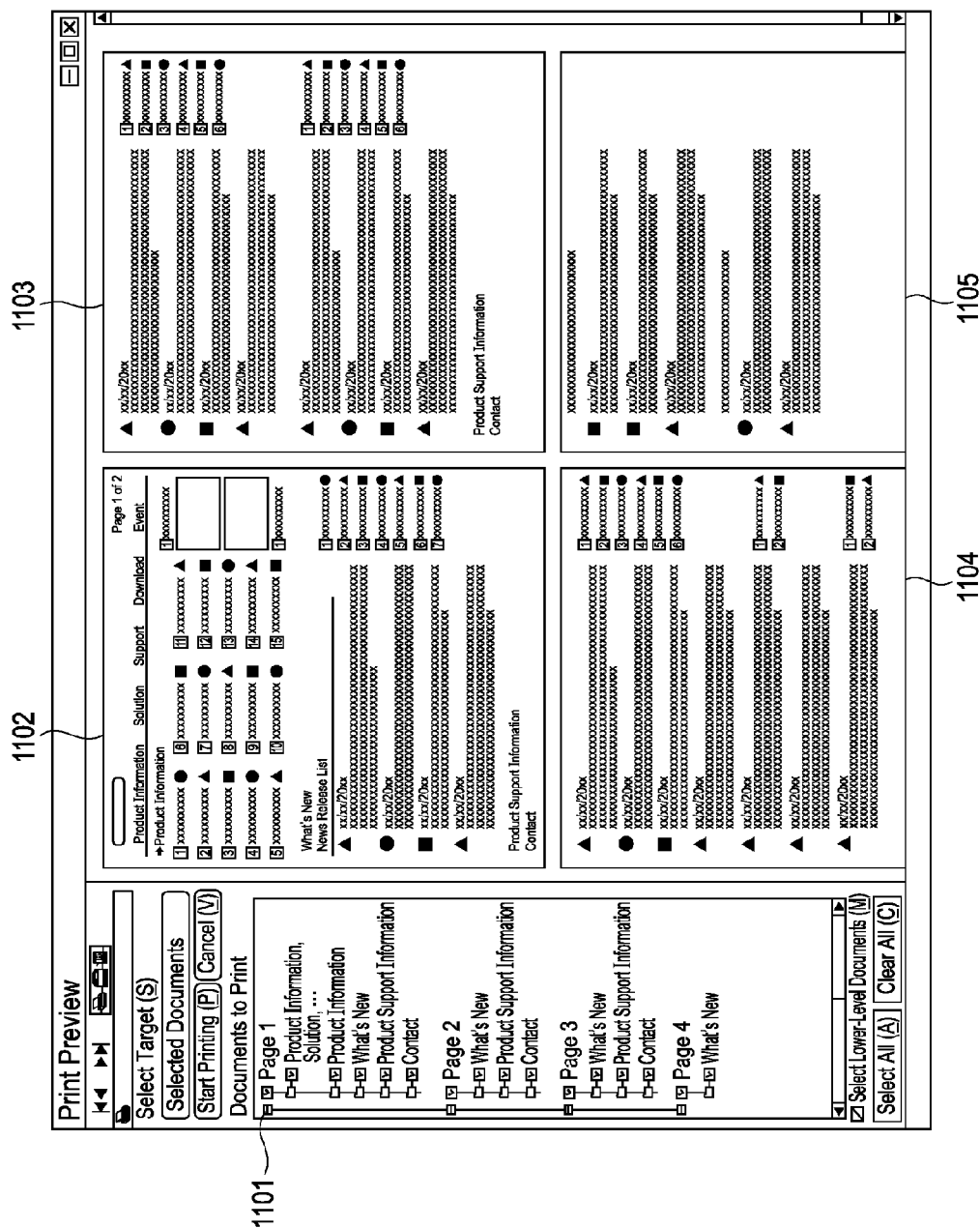
FIG. 11 illustrates an example of an element tree view representing a print-target-element tree created for a plurality of pages to be printed.

In the above explanation, an element tree view is created and displayed for a print preview for one page. However, the present invention is not limited to this. FIG. 11 illustrates an example of an element tree view representing a print-target-element tree created for a plurality of pages to be printed.

Referring to FIG. 11, four pages 1102, 1103, 1104, and 1105 to be printed are displayed in the print preview display section, and an element tree view 1101 contains items "Page 1", "Page 2", "Page 3", and "Page 4" corresponding to the four pages 1102, 1103, 1104, and 1105, respectively. Each of these items has one or more sub-items corresponding to one or more elements contained in each page. The element tree view 1101 is thus structured.

Another exemplary embodiment of the present invention will now be described. The present exemplary embodiment differs from the above-described exemplary embodiments only in that the print layout unit 305 of FIG. 3 does not display a tree view, but displays a layout view showing positions of elements in a print preview image. In the present exemplary embodiment, a configuration and processing identical to those of the above-described exemplary embodiments will not be described.

Figure 12B:
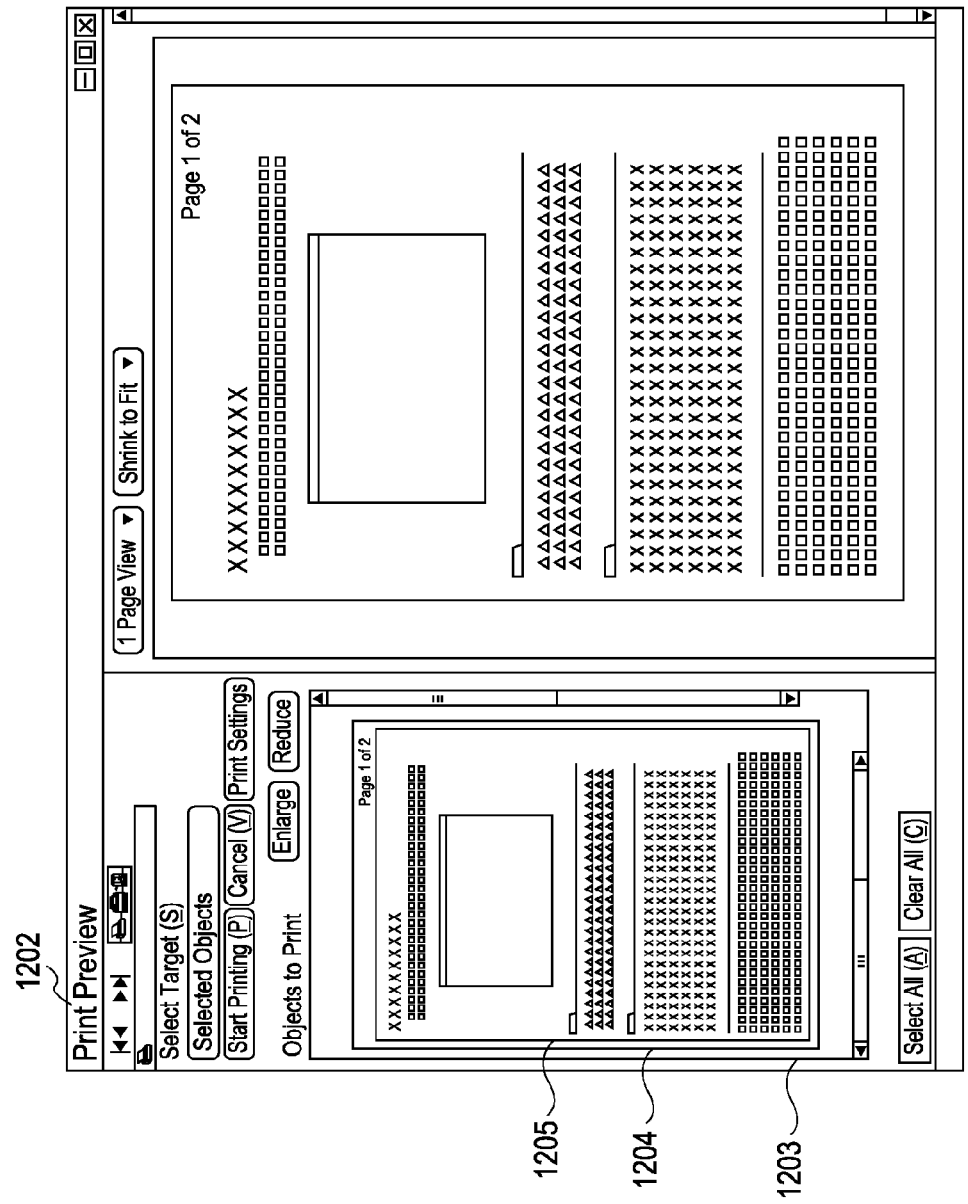
FIG. 12B illustrates another example of the print preview screen of FIG. 12A.

FIG. 12A to FIG. 12D each illustrate an example of a print preview screen including a layout view. FIG. 12A illustrates an example of a GUI screen displayed by software on the PC 101 for printing a structured document on a printing apparatus according to the present exemplary embodiment. Referring to FIG. 12A, the browser 301 displays a Web page on the GUI. A Print Preview button 1201 is arranged within a window of the browser 301. When the user presses the Print Preview button 1201, the browser 301 calls the print module 302 using a structured document file of the displayed Web page as a parameter. The print module 302 analyzes the specified structured document file and displays a print preview screen 1202 on the display device 206. A layout view 1203 within the print preview screen 1202 is obtained when the element selecting unit 304 displays a thumbnail 1204 and a selected element frame 1205 on the GUI. The thumbnail 1204 is a thumbnail of the Web page where elements in a print-target-element tree generated by the document analyzing unit 303 are laid out.

The selected element frame 1205 corresponds to each element in the print-target-element tree. An element selected as a print target is surrounded by the selected element frame 1205, whereas an element not selected as a print target is not surrounded by the selected element frame 1205.

A click operation on or inside the selected element frame 1205 selects and deselects an element surrounded by the selected element frame 1205. A double-click operation removes the selected element frame 1205, divides the element into child elements, and displays individual selected element frames for all the child elements.

An Enlarge button 1206 and a Reduce button 1207 on the print preview screen 1202 are used to enlarge and reduce, respectively, the display within the layout view 1203. The display within the layout view 1203 is enlarged or reduced with reference to the center of the layout view 1203.

If the thumbnail 1204 of the Web page does not fit in the layout view 1203, at least one of a vertical scroll bar 1208 and a horizontal scroll bar 1209 appears. The vertical scroll bar 1208 and the horizontal scroll bar 1209 are moved to allow the user to view the entire thumbnail 1204 of the Web page.

A print preview display section 1213 displays, on the GUI, a print preview image generated by the print preview unit 306. The print preview display section 1213 displays a print preview where only elements selected on the layout view 1203 are arranged in a print layout.

On the print preview screen 1202, a Start Printing button 1210 and a Cancel button 1211 are buttons used to start and stop printing, respectively, and a Print Settings menu 1212 is a drop-down menu for making various settings for printing. The user uses the Print Settings menu 1212 to specify paper size, print quality, margin, etc.

Figure 12C:
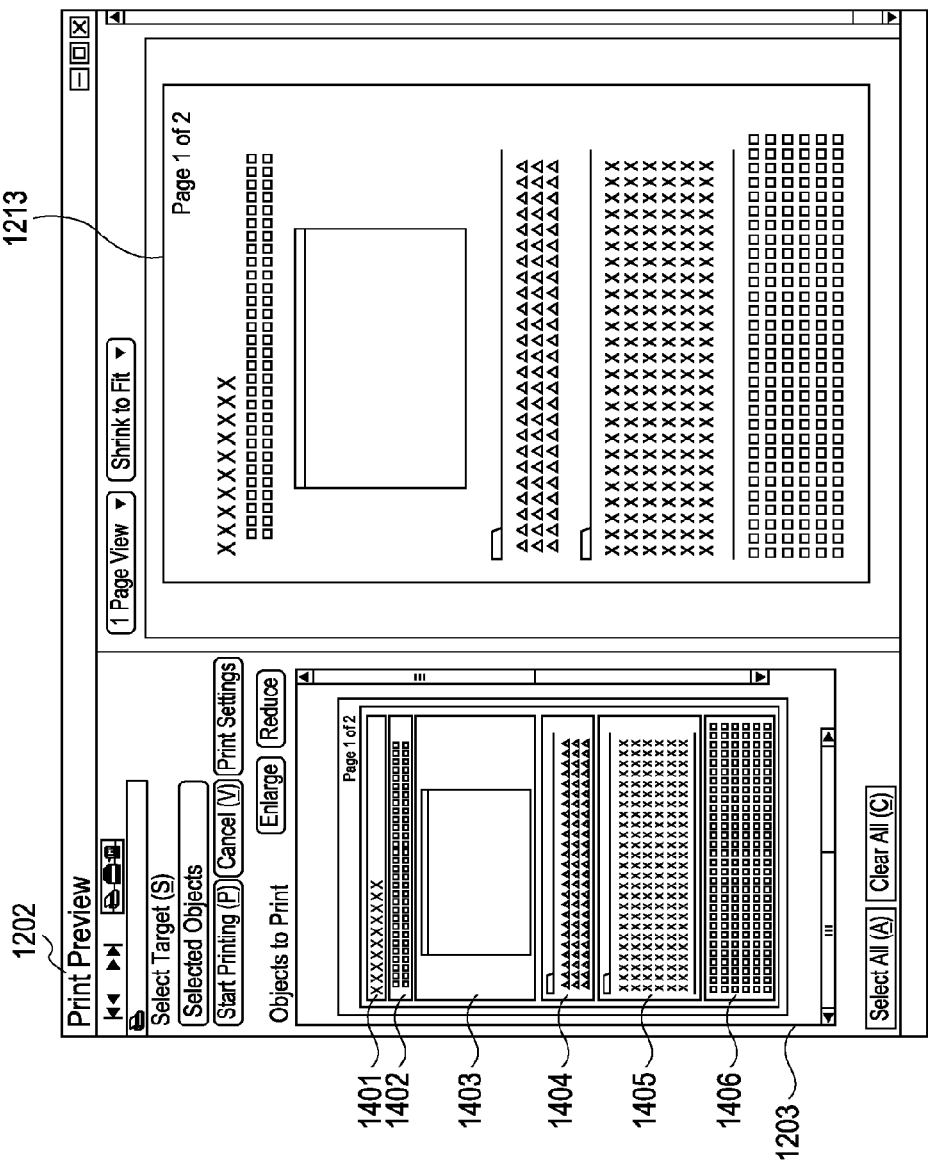
FIG. 12C illustrates another example of the print preview screen of FIG. 12A.
Figure 12D:
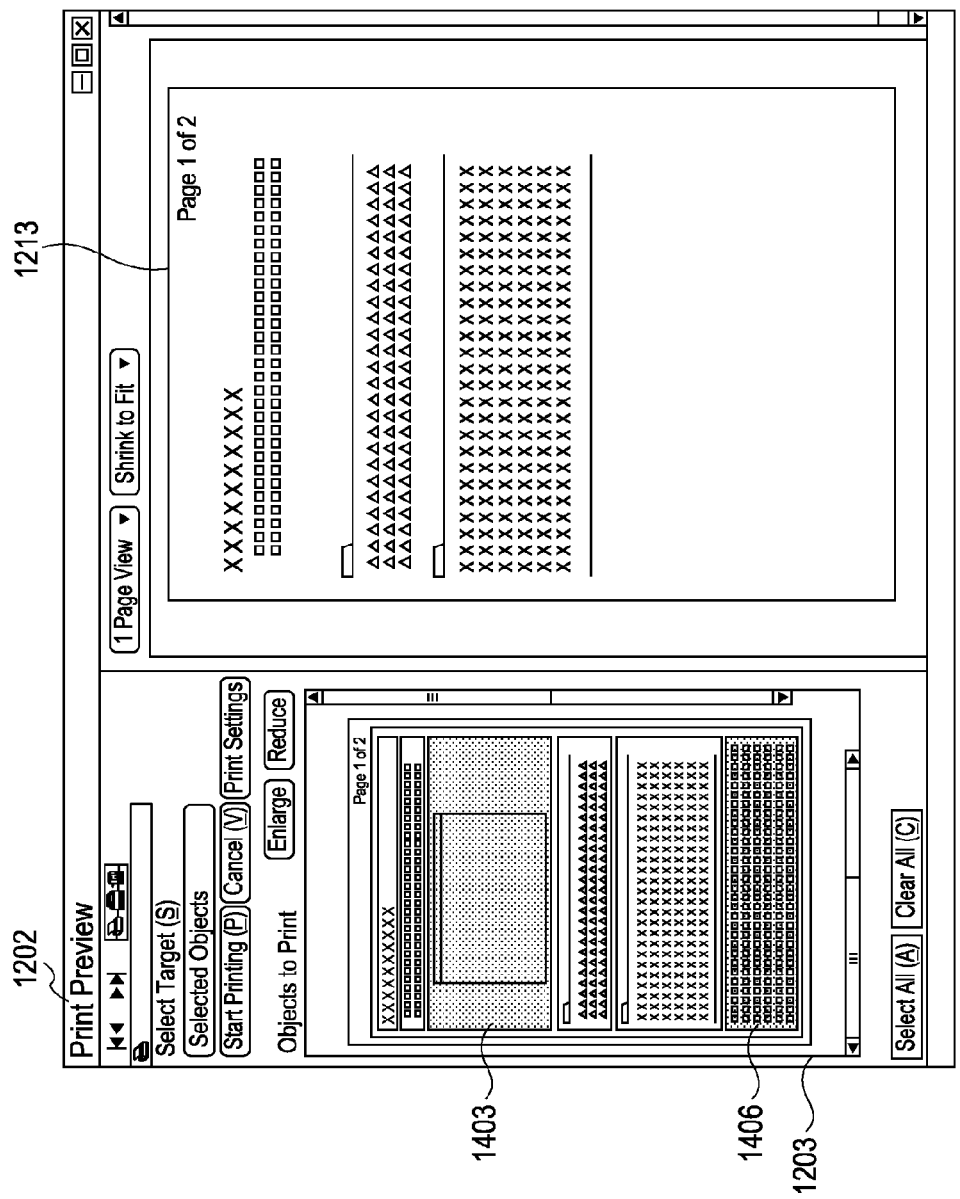
FIG. 12D illustrates another example of the print preview screen of FIG. 12A.

FIG. 12B, FIG. 12C, and FIG. 12D each illustrate a GUI screen to explain operations performed on the print preview screen 1202 for element selection. FIG. 12B illustrates the print preview screen 1202 where, immediately after the print preview screen 1202 is displayed, all elements within the thumbnail 1204 of the Web page are surrounded as print targets by the selected element frame 1205. FIG. 12C illustrates a GUI screen displayed immediately after a double-click operation on or inside the selected element frame 1205 within the layout view 1203. As illustrated, child elements are individually surrounded by selected element frames.

In the layout view 1203 of FIG. 12C, child elements 1401, 1402, 1403, 1404, 1405, and 1406 are all selected as print targets. FIG. 12D illustrates a GUI screen displayed after some child elements within the layout view 1203 are deselected by a mouse-click.

In the layout view 1203 of FIG. 12D, the child elements 1403 and 1406, which are deselected, are not surrounded by selected element frames and are displayed with translucent shading. The deselected child elements 1403 and 1406 are not displayed in the print preview display section 1213, and other elements are slid upward and rearranged.

As described above, by operating the element selecting unit 304 and the print preview unit 306 through GUI operation and the print layout unit 305, the user can easily select and deselect elements to be printed.

A storage medium in which software program code for realizing the functions of the above-described exemplary embodiments is stored may be supplied to a system or an apparatus. The present invention can be provided when a computer (or CPU or micro-processing unit (MPU)) of the system or apparatus reads and executes the program code stored in the storage medium. In this case, the program code read out of the storage medium realizes the functions according to the above-described exemplary embodiments. Therefore, the storage medium storing the program code constitutes the present invention.

Examples of the storage medium for supplying the program code include a flexible disk, a hard disk, an optical disk, a magneto-optical disk, a compact-disk read-only memory (CD-ROM), a CD-recordable (CD-R), a magnetic tape, a non-volatile memory card, a ROM, and a digital versatile disk (DVD).

As described above, the functions of the above-described exemplary embodiments are realized by executing the program code read out by the computer. Additionally, for example, in accordance with an instruction of the program code, an OS running on the computer may perform all or part of the actual processing, so that the functions according to the above-described exemplary embodiments are realized by this processing.

Furthermore, after the program code is read out of the storage medium, it can be written to a function expansion board inserted in the computer or to a memory provided in a function expansion unit connected to the computer. In this case, in accordance with an instruction of the program code, a CPU or the like mounted on the function expansion board or function expansion unit may perform all or part of the actual processing, so that the functions of the above-described exemplary embodiments are realized by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130763, filed May 19, 2008, which is hereby incorporated by reference herein in its entirety.

The invention claimed is:

1. A method for processing a plurality of elements included in a structured document, the method comprising:
    specifying a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;
    causing a display screen to execute display of a display item and display indicating a first area corresponding to the first element and a second area corresponding to the second element in an image which is displayed in the display screen based on the structured document, so that a target area of the indication in the first area and the second area change according to an instruction for the display item by a user; and
    outputting, according to an instruction by the user, an output-target element selected from the first element corresponding to the indicated first area and the second element corresponding to the indicated second area,
    wherein in a case where the first element is selected as the output-target element, at least one of other elements among the plurality of elements is not output.

2. The method according to claim 1,
    wherein a first display item corresponding to the first element and a second display item corresponding to the second element are displayed, as the display item, and
    wherein one of the first area and the second area is displayed which corresponds to a display item designated by the user.

3. The method according to claim 2, wherein the first display item and the second display item are displayed, so as to indicate that the first element and the second element respectively correspond to the first hierarchy and the second hierarchy.

4. The method according to claim 3, wherein a tree image including the first display item and the second display item is displayed.

5. The method according to claim 2, wherein a layout image including the first display item and the second display item showing positions of the first element and the second element is displayed.

6. The method according to claim 1, wherein the outputting displays a print preview image where the output-target element is arranged and another element among the plurality of elements is omitted, and an image corresponding to the print preview image is output to a printing apparatus and the image is printed by the printing apparatus.

7. The method according to claim 1, wherein one or more output-target elements are selected from the first element, the second element, and a third element corresponding to the first hierarchy.

8. The method according to claim 1, wherein display of a web page as the image is executed based on the structured document.

9. The method according to claim 1, wherein the second element is a parent element to the first element.

10. The method according to claim 1, further comprising:
    selecting an output-target element from the first element corresponding to the indicated first area and the second element corresponding to the indicated second area, according to an instruction by the user for a second display item which is displayed in the display screen and is different from the display item used for the change of the target area of the indication,
    wherein the output-target element which is selected from the first element and the second element according to the instruction for the second display item, is output.

11. An apparatus for processing a plurality of elements included in a structured document, the apparatus comprising:
    a specifying unit configured to specify a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;
    a display control unit configured to cause a display screen to execute display of a display item and display indicating a first area corresponding to the first element and a second area corresponding to the second element in an image which is displayed in the display screen based on the structured document, so that a target area of the indication in the first area and the second area change according to an instruction for the display item by a user; and an outputting unit configured to output, according to an instruction by the user, an output-target element selected from the first element corresponding to the indicated first area and the second element corresponding to the indicated second area, wherein in a case where the first element is selected as the output-target element, at least one of other elements among the plurality of elements is not output.

12. The apparatus according to claim 11, wherein a first display item corresponding to the first element and a second display item corresponding to the second element are displayed, as the display item, and wherein one of the first area and the second area is displayed which corresponds to a display item designated by the user.

13. The apparatus according to claim 12, wherein the first display item and the second display item are displayed, so as to indicate that the first element and the second element respectively correspond to the first hierarchy and the second hierarchy.

14. The apparatus according to claim 13, wherein a tree image including the first display item and the second display item is displayed.

15. The apparatus according to claim 12, wherein a layout image including the first display item and the second display item showing positions of the first element and the second element is displayed.

16. The apparatus according to claim 11, wherein display of a web page as the image is executed based on the structured document.

17. The apparatus according to claim 11, wherein a second element is a parent element to the first element.

18. A non-transitory computer-readable recording medium recording a program for causing a computer to execute a method for processing a plurality of elements included in a structured document, the method comprising:

specifying a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;

causing a display screen to execute display of a display item and display indicating a first area corresponding to the first element and a second area corresponding to the second element in an image which is displayed in the display screen based on the structured document, so that a target area of the indication in the first area and the second area change according to an instruction for the display item by a user; and outputting, according to an instruction by the user, an output-target element selected from the first element corresponding to the indicated first area and the second element corresponding to the indicated second area, wherein in a case where the first element is selected as the output-target element, at least one of other elements among the plurality of elements is not output.

19. The non-transitory computer-readable recording medium according to claim 18, wherein the program is a plug-in program for a web browser which causes the display screen to display a web page based on the structured document.

20. A method for processing a plurality of elements included in a structured document, the method comprising:

specifying a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;

causing a display screen to execute display of a display item and display indicating a first area corresponding to the first element and a second area corresponding to the second element in an image which is displayed in the display screen based on the structured document, so that in a case where an instruction for the display item by a user is input when the first area is indicated, the second area is indicated instead of the first area; and outputting, according to an instruction by the user, an output-target element selected from the first element corresponding to the indicated first area and the second element corresponding to the indicated second area, wherein in a case where the first element is selected as the output-target element, at least one of other elements among the plurality of elements is not output.

21. The method according to claim 20, further comprising:

selecting an output-target element from the first element corresponding to the indicated first area and the second element corresponding to the indicated second area, according to an instruction by the user for a second display item which is displayed in the display screen and is different from the display item used for the change of the target area of the indication, wherein the output-target element which is selected from the first element and the second element according to the instruction for the second display item, is output.

22. A non-transitory computer-readable recording medium recording a program for causing a computer to execute a method for processing a plurality of elements included in a structured document, the method comprising:

specifying a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;

causing a display screen to execute display of a display item and display indicating a first area corresponding to the first element and a second area corresponding to the second element in an image which is displayed in the display screen based on the structured document, so that in a case where an instruction for the display item by a user is input when the first area is indicated, the second area is indicated instead of the first area; and outputting, according to an instruction by the user, an output-target element selected from the first element corresponding to the indicated first area and the second element corresponding to the indicated second area, wherein in a case where the first element is selected as the output-target element, at least one of other elements among the plurality of elements is not output.

23. The non-transitory computer-readable recording medium according to claim 22, wherein the program is a plug-in program for a web browser which causes the display screen to display a web page based on the structured document.

24. A method for processing a plurality of elements included in a structured document, the method comprising:

specifying a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;

causing a display screen to execute display of a display item and display indicating a first area corresponding to the first element and a second area corresponding to the second element in an image which is displayed in the display screen based on the structured document, so that in a case where an instruction for the display item by a user is input when the second area is indicated, the first area is indicated instead of the second area; and outputting, according to an instruction by the user, an output-target element selected from the first element corresponding to the indicated first area and the second element corresponding to the indicated second area, wherein in a case where the first element is selected as the output-target element, at least one of other elements among the plurality of elements is not output.

25. The method according to claim 24, further comprising:

selecting an output-target element from the first element corresponding to the indicated first area and the second element corresponding to the indicated second area, according to an instruction by the user to a second display item which is displayed in the display screen and is different from the display item used for a change of a target area of the indication; and wherein the output-target element which is selected from the first element and the second element according to the instruction for the second display item, is output.

26. A non-transitory computer-readable recording medium recording a program for causing a computer to execute a method for processing a plurality of elements included in a structured document, the method comprising:

specifying a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements; causing a display screen to execute display of a display item and display indicating a first area corresponding to the first element and a second area corresponding to the second element in an image which is displayed in the display screen based on the structured document, so that in a case where an instruction for the display item by a user is input when the second area is indicated, the first area is indicated instead of the second area; and outputting, according to an instruction by the user, an output-target element selected from the first element corresponding to the indicated first area and the second element corresponding to the indicated second area, wherein in a case where the first element is selected as the output-target element, at least one of other elements among the plurality of elements is not output.

27. The non-transitory computer-readable recording medium according to claim 26, wherein the program is a plug-in program for a web browser which causes the display screen to display a web page based on the structured document.

28. An apparatus for processing a plurality of elements included in a structured document, the apparatus comprising:

a specifying unit configured to specify a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;

a display control unit configured to cause a display screen to execute display of a display item and display indicating a first area corresponding to the first element and a second area corresponding to the second element in an image which is displayed in the display screen based on the structured document, so that in a case where an instruction for the display item by a user is input when the second area is indicated, the first area is indicated instead of the second area; and an output unit configured to output, according to an instruction by the user, an output-target element selected from the first element corresponding to the indicated first area and the second element corresponding to the indicated second area, wherein in a case where the first element is selected as the output-target element, at least one of other elements among the plurality of elements is not output.

29. An apparatus for processing a plurality of elements included in a structured document, the apparatus comprising:

a specifying unit configured to specify a first element corresponding to a first hierarchy, in a hierarchical structure based on analysis of the structured document, and a second element corresponding to a second hierarchy in the hierarchical structure which is higher-level than the first hierarchy in the hierarchical structure, out of the plurality of elements;

a display control unit configured to cause a display screen to execute display of a display item and display indicating a first area corresponding to the first element and a second area corresponding to the second element in an image which is displayed in the display screen based on the structured document, so that a target area of the indication in the first area and the second area change according to an instruction for the display item by a user;

a selecting unit configured to select an output-target element from the first element corresponding to the indicated first area and the second element corresponding to the indicated second area, according to an instruction by the user; and an outputting unit configured to output the output-target element of the first element and the second element.

* * * * *